(12) United States Patent
Ghiasi

(10) Patent No.: US 9,485,199 B2
(45) Date of Patent: Nov. 1, 2016

(54) SYSTEM AND METHOD FOR DATA FLOW IDENTIFICATION AND ALIGNMENT IN A 40/100 GIGABIT ETHERNET GEARBOX

(71) Applicant: Broadcom Corporation, Irvine, CA (US)

(72) Inventor: Ali Ghiasi, Cupertino, CA (US)

(73) Assignee: BROADCOM CORPORATION, Irvine, CA (US)

( * ) Notice: Subject to any disclaimer, the term of this patent is extended or adjusted under 35 U.S.C. 154(b) by 136 days.

(21) Appl. No.: 13/853,164

(22) Filed: Mar. 29, 2013

(65) Prior Publication Data

US 2014/0241369 A1    Aug. 28, 2014

Related U.S. Application Data

(60) Provisional application No. 61/770,414, filed on Feb. 28, 2013.

(51) Int. Cl.
*H04L 12/861*    (2013.01)

(52) U.S. Cl.
CPC ................................ *H04L 49/9057* (2013.01)

(58) Field of Classification Search
CPC ... H04B 17/00; H04B 10/0771; H04J 15/00; H04J 2203/0094; H04J 3/00; H04L 1/00

USPC ......................... 370/242, 394, 498, 522, 535
See application file for complete search history.

(56) References Cited

U.S. PATENT DOCUMENTS

| | | | |
|---|---|---|---|
| 8,582,437 B2 | 11/2013 | Ghiasi et al. | |
| 8,873,591 B2 * | 10/2014 | Ghiasi et al. | 370/535 |
| 2009/0232133 A1 * | 9/2009 | Yu et al. | 370/389 |
| 2010/0142525 A1 * | 6/2010 | Cho et al. | 370/389 |

OTHER PUBLICATIONS

Gustlin, Mark; 100GE and 40GE PCS Proposal; Sep. 2007; IEEE HSSG; pp. 5-11, 13-20, 23-26, 30.*
IEEE 802.3ba™-2010, Part 3: Carrier Sense Multiple Access with Collision Detection (CSMA/CD) Access Method and Physical Layer Specifications, pp. 148-433, Jun. 22, 2010.

* cited by examiner

*Primary Examiner* — Gary Mui
*Assistant Examiner* — Stephen Steiner
(74) *Attorney, Agent, or Firm* — Foley & Lardner LLP; Christopher J. McKenna; Daniel E. Rose

(57) ABSTRACT

A system and method for data flow identification and alignment in a 40/100 gigabit Ethernet gearbox. Virtual lane (VL) identifiers can be identified to create an effective wiring diagram for data flows. This wiring diagram enables a multiplexer or de-multiplexer to align the VL identifiers to match physical lane identifiers.

14 Claims, 7 Drawing Sheets

| 10 | $M_0$ | $M_1$ | $M_2$ | $BIP_3$ | $M_4$ | $M_5$ | $M_6$ | $BIP_7$ |
|---|---|---|---|---|---|---|---|---|
| 0 1 | 2 9 | 10 17 | 18 25 | 26 33 | 34 41 | 42 49 | 50 57 | 58 65 |

*FIG. 3*

SYSTEM AND METHOD FOR DATA FLOW IDENTIFICATION AND ALIGNMENT IN A 40/100 GIGABIT ETHERNET GEARBOX

This application claims priority to provisional application No. 61/770,414, filed Feb. 28, 2013, which is incorporated herein by reference in its entirety.

BACKGROUND

1. Field of the Invention

The present invention relates generally to networking and, more particularly, to a system and method for data flow identification and alignment in a 40/100 gigabit Ethernet gearbox.

2. Introduction

Increasing demands are being placed upon the data communications infrastructure. These increasing demands are driven by various factors, including the increasing bandwidth requirements of multimedia traffic. To accommodate the increasing bandwidth requirements, communication link speeds have also continued to evolve. Today, 10 Gigabit Ethernet (GbE) ports are commonly used. Management of today's networks will become increasingly important as network speeds continue to increase.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3 illustrates an example embodiment of data flow marking using multi-lane distribution PCS lane identifiers.

DETAILED DESCRIPTION

Figure 1:
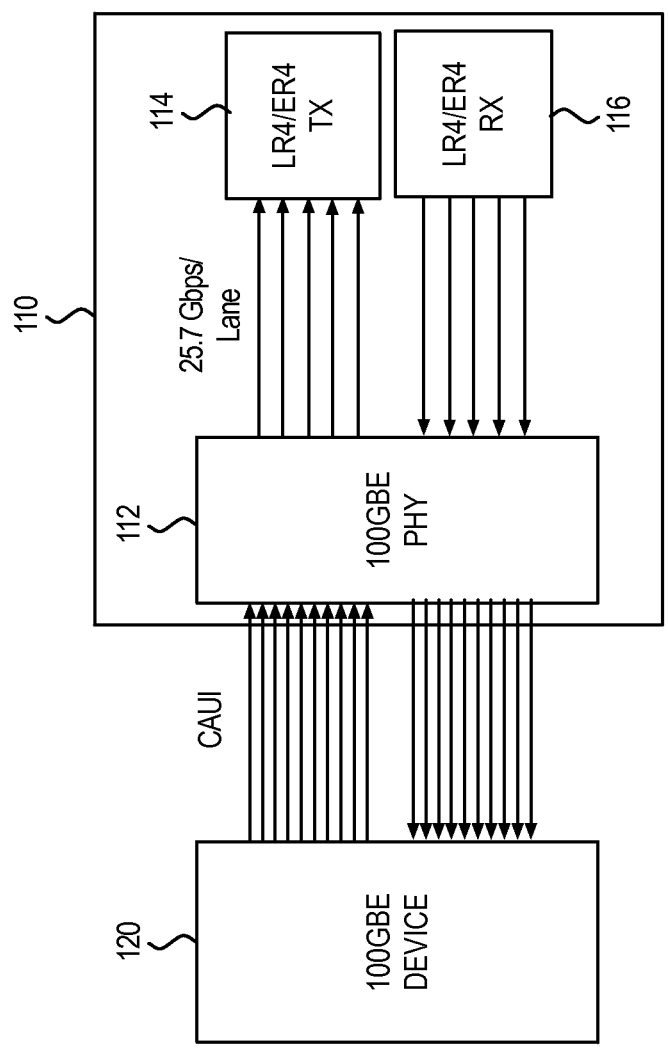
FIG. 1 illustrates an example environment of a 100 gigabit Ethernet gearbox.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Network switches are being designed with ever increasing bandwidth. In one embodiment, switch bandwidth increases are enabled through an increase in the I/O speed of the switch. For example, four 25.7 Gbps lanes can be used to transport 100 GbE traffic. This is in contrast to the conventional use of ten 10.3125 Gbps lanes to transport 100 GbE traffic.

In 100 GbE, the Physical Coding Sublayer (PCS) of the physical layer device (PHY) defines 20 virtual lanes where each of the virtual lanes can subsequently be bit-multiplexed to a higher baudrate. In the present invention, it is recognized that one of the major issues with bit multiplexing is loss of knowledge when one of the intermediary lanes is misbehaving. This loss of knowledge can be significant as there can be a resulting inability to trace the traffic flow path. The difficulty in effectively managing the network can therefore increase, raising network management costs.

It is a feature of the present invention that the loss of knowledge resulting from bit multiplexing can be alleviated through an identification of virtual lane (VL) identifiers that can effectively create a wiring diagram for the data flows. In one embodiment, such identification can be implemented in an auxiliary light PCS. In general, the functional creation of a wiring diagram can enable the multiplexer or the de-multiplexer to align the VL identifiers to match the physical lane identifiers. In a 100 GbE example, VLs 0-9/10-19 can be aligned to physical lanes 0-9. This alignment of virtual lanes to physical lanes enables traffic flow paths to be traced.

In one embodiment, a device includes a plurality of inputs for receiving a corresponding first plurality of channels, a data flow identifier module that is configured to identify data flow identifiers contained within the first plurality of channels, and a bit multiplexer that is configured to multiplex bits from the first plurality of channels into one or more second channels that have a higher bit rate as compared to the first plurality of channels, wherein an ordering of bits that are multiplexed into the one or more second channels is based on an identity of the data flow identifiers that are identified by the data flow identifier module.

In another embodiment, a device includes a plurality of inputs for receiving a corresponding first plurality of channels, a data flow identifier module that is configured to identify data flow identifiers contained within the first plurality of channels, and a bit de-multiplexer that is configured to de-multiplex bits from the first plurality of channels into a second plurality of channels that have a lower bit rate as compared to the first plurality of channels, wherein an ordering of bits that are de-multiplexed into the second plurality of channels is based on an identity of the data flow identifiers that are identified by the data flow identifier module.

In general, devices according to the present invention can be designed to identify data flow identifiers contained within a plurality of data flows that are received by a data flow identifier module in the device and align, based on the identified data flow identifiers, the first plurality of data flows onto a plurality of physical lanes that are coupled to a transmitter of the device.

To illustrate the various features of the present invention, reference is made first to FIG. 1, which illustrates an example environment of a 40/100 gigabit Ethernet gearbox. As would be appreciated, the example environment is not intended to be limiting on the principles of the present invention. Rather, the example environment illustrates one example application of the principles of the present invention.

As illustrated, 100 Gigabit small-form-factor pluggable (CFP) module 110 is coupled to device 120 (e.g., 100 GbE switch, packet processor, ASIC, etc.) via a 100 Gigabit Attachment Unit Interface (CAUI). The CAUI interface defines 10 lanes running at 10.3125 Gbps. CFP module 110 further includes 100 GbE physical layer device (PHY) 112, LR4/ER4 fiber optic transmitter 114 and LR4/ER4 fiber optic receiver 116. In providing an interface between 10 lanes running at 10.3125 Gbps and four lanes running at 25.7 Gbps, 100 GbE PHY 112 includes a gearbox and inverse gearbox that incorporates features of the invention described above. A detailed description of such features is provided below. In general, 100 GbE PHY 112 includes a gearbox and inverse gearbox, which includes a bit multiplexer and de-multiplexer, respectively.

Figure 2A:
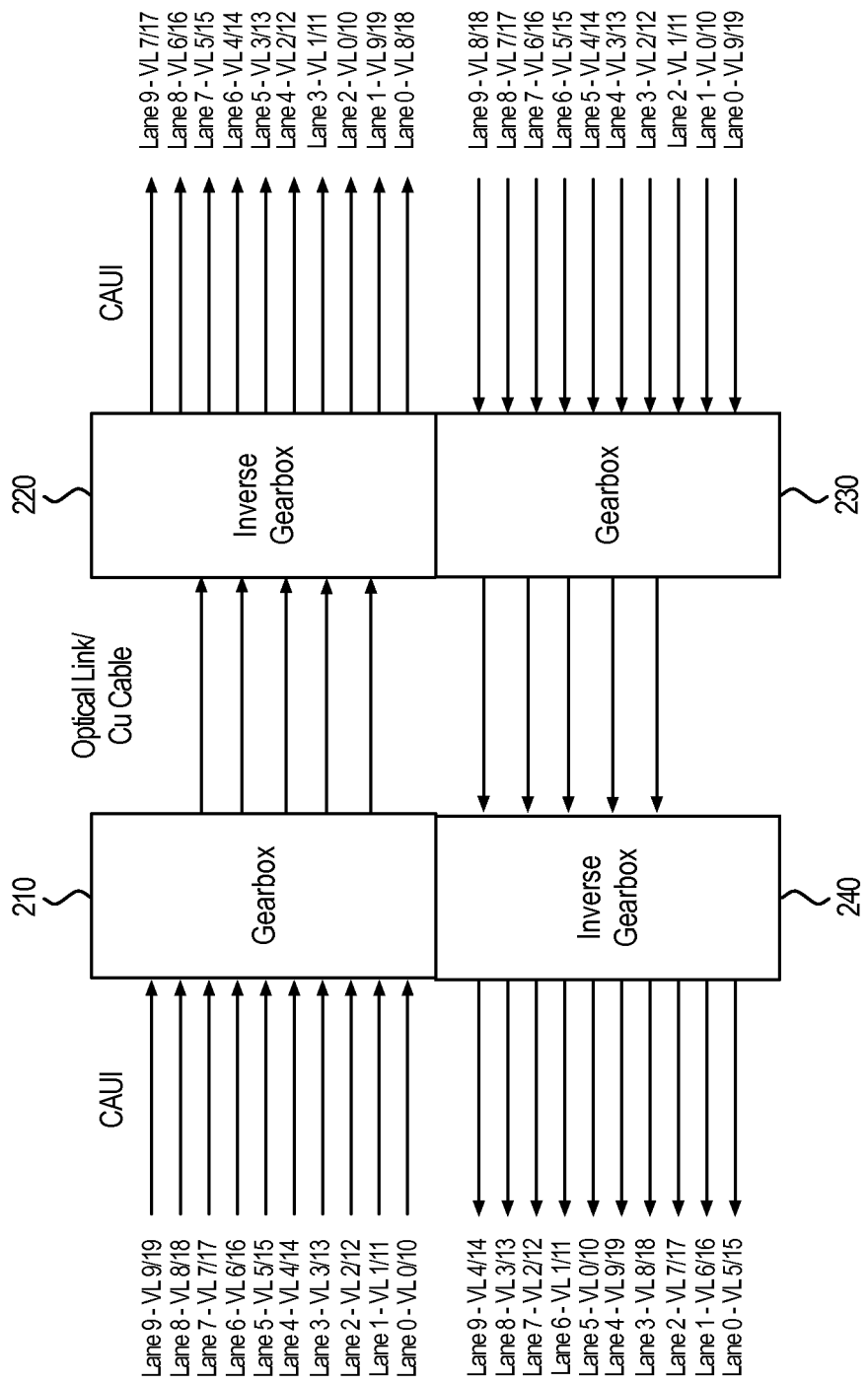
FIGS. 2A and 2B illustrate an example operation of a 100 Gigabit Ethernet gearbox cascaded with an 100 Gigabit Ethernet inverse gearbox.

FIG. 2A illustrates an example operation of a conventional 100 GbE gearbox cascaded with a 100 GbE inverse gearbox. As illustrated, gearbox 210 is coupled to inverse gearbox 220 via an optical link or copper cable, while gearbox 230 is coupled to inverse gearbox 240 via the optical link or copper cable. In cascaded form, the combination of gearbox 210 and inverse gearbox 220 as well as the combination of gearbox 230 and inverse gearbox 240 serve to facilitate communication of 10 lanes of 10.3125 Gbps traffic as a 100 GbE link.

Multi-Lane Distribution (MLD) defines 20 virtual lanes for 100 GbE and four virtual lanes for 40 GbE. MLD PCS lane identifiers are defined in IEEE 802.3 Clause 82. Table 1 below identifies the 100 GbE PCS lane identifiers that are arranged in the format illustrated in FIG. 3. Here, Bit Interleaved Parity (BIP) field $BIP_7$ is a bit-wise inversion of $BIP_3$.

TABLE 1

| PCS Lane Number | Encoding ($M_0$, $M_1$, $M_2$, $BIP_3$, $M_4$, $M_5$, $M_6$, $BIP_7$) |
| --- | --- |
| 0 | 0xC1, 0x68, 0x21, $BIP_3$, 0x3E, 0x97, 0xDE, $BIP_7$ |
| 1 | 0x9D, 0x71, 0x8E, $BIP_3$, 0x62, 0x8E, 0x71, $BIP_7$ |
| 2 | 0x59, 0x4B, 0xE8, $BIP_3$, 0xA6, 0xB4, 0x17, $BIP_7$ |
| 3 | 0x4D, 0x95, 0x7B, $BIP_3$, 0xB2, 0x6A, 0x84, $BIP_7$ |
| 4 | 0xF5, 0x07, 0x09, $BIP_3$, 0x0A, 0xF8, 0xF6, $BIP_7$ |
| 5 | 0xDD, 0x14, 0xC2, $BIP_3$, 0x22, 0xEB, 0x3D, $BIP_7$ |
| 6 | 0x9A, 0x4A, 0x26, $BIP_3$, 0x65, 0xB5, 0xD9, $BIP_7$ |
| 7 | 0x7B, 0x45, 0x66, $BIP_3$, 0x84, 0xBA, 0x99, $BIP_7$ |
| 8 | 0xA0, 0x24, 0x76, $BIP_3$, 0x5F, 0xDB, 0x89, $BIP_7$ |
| 9 | 0x68, 0xC9, 0xFB, $BIP_3$, 0x97, 0x36, 0x04, $BIP_7$ |
| 10 | 0xFD, 0x6C, 0x99, $BIP_3$, 0x02, 0x93, 0x66, $BIP_7$ |
| 11 | 0xB9, 0x91, 0x55, $BIP_3$, 0x46, 0x6E, 0xAA, $BIP_7$ |
| 12 | 0x5C, 0xB9, 0xB2, $BIP_3$, 0xA3, 0x46, 0x4D, $BIP_7$ |
| 13 | 0x1A, 0xF8, 0xBD, $BIP_3$, 0xE5, 0x07, 0x42, $BIP_7$ |
| 14 | 0x83, 0xC7, 0xCA, $BIP_3$, 0x7C, 0x38, 0x35, $BIP_7$ |
| 15 | 0x35, 0x36, 0xCD, $BIP_3$, 0xCA, 0xC9, 0x32, $BIP_7$ |
| 16 | 0xC4, 0x31, 0x4C, $BIP_3$, 0x3B, 0xCE, 0xB3, $BIP_7$ |
| 17 | 0xAD, 0xD6, 0xB7, $BIP_3$, 0x52, 0x29, 0x48, $BIP_7$ |
| 18 | 0x5F, 0x66, 0x2A, $BIP_3$, 0xA0, 0x99, 0xD5, $BIP_7$ |
| 19 | 0xC0, 0xF0, 0xE5, $BIP_3$, 0x3F, 0x0F, 0x1A, $BIP_7$ |

In general, the virtual lane IDs enable reconstruction of the Ethernet frame by the receiving PCS. In the process of bit-multiplexing, specific virtual lane traffic no longer travels on the associated (originated) physical lane. This lack of correspondence makes de-bugging or testing of the system very difficult, thereby increasing the network management costs.

FIG. 2A illustrates the lack of correspondence between virtual lane traffic and physical lanes that is produced by the conventional operation of a 100 GbE gearbox cascaded with a 100 GbE inverse gearbox. As illustrated in the upper left hand portion of FIG. 2A, VL 0/10 to 9/19 are traveling on physical lanes 0-9, respectively. Upon traversal through gearbox 210 and inverse gearbox 220, however, the outputs produced by inverse gearbox 220 are virtual lanes that are have lost their correspondence with specific physical lanes. In other words, the virtual lanes output by inverse gearbox 220 no longer have an association with specific physical lanes. For example, VL 8/18 is now output by inverse gearbox 220 onto physical lane 0. This is in contrast to the association of VL 8/18 with physical lane 8 on the input to gearbox 210. In general, the conventional operation of a 100 GbE gearbox cascaded with a 100 GbE inverse gearbox serves to scramble the association of VLs and physical lanes.

At the lower right hand portion of FIG. 2A, the inputs to gearbox 230 are already scrambled such that there is no correspondence between the virtual lanes and the physical lanes at the input to gearbox 230. Upon traversal through gearbox 230 and inverse gearbox 240, the virtual lanes are even further scrambled as illustrated at the outputs of inverse gearbox 240. For example, VL 9/19 is received on physical lane 0 at the input to gearbox 230, then subsequently output on physical lane 4 by inverse gearbox 240. As previously noted, this scrambling and loss of correspondence between VLs and physical lanes makes de-bugging or testing in VL-based systems very cumbersome.

In the present invention, it is recognized that the identification of VL identifiers can be used to effectively create a wiring diagram for re-alignment of the virtual lanes. In one embodiment, such a feature of the present invention is incorporated as an auxiliary light PCS element. It is a feature of the present invention that the identification of VL identifiers and the realignment based on the identified VL identifiers enables the virtual lanes to be matched with the physical lanes.

Figure 2B:
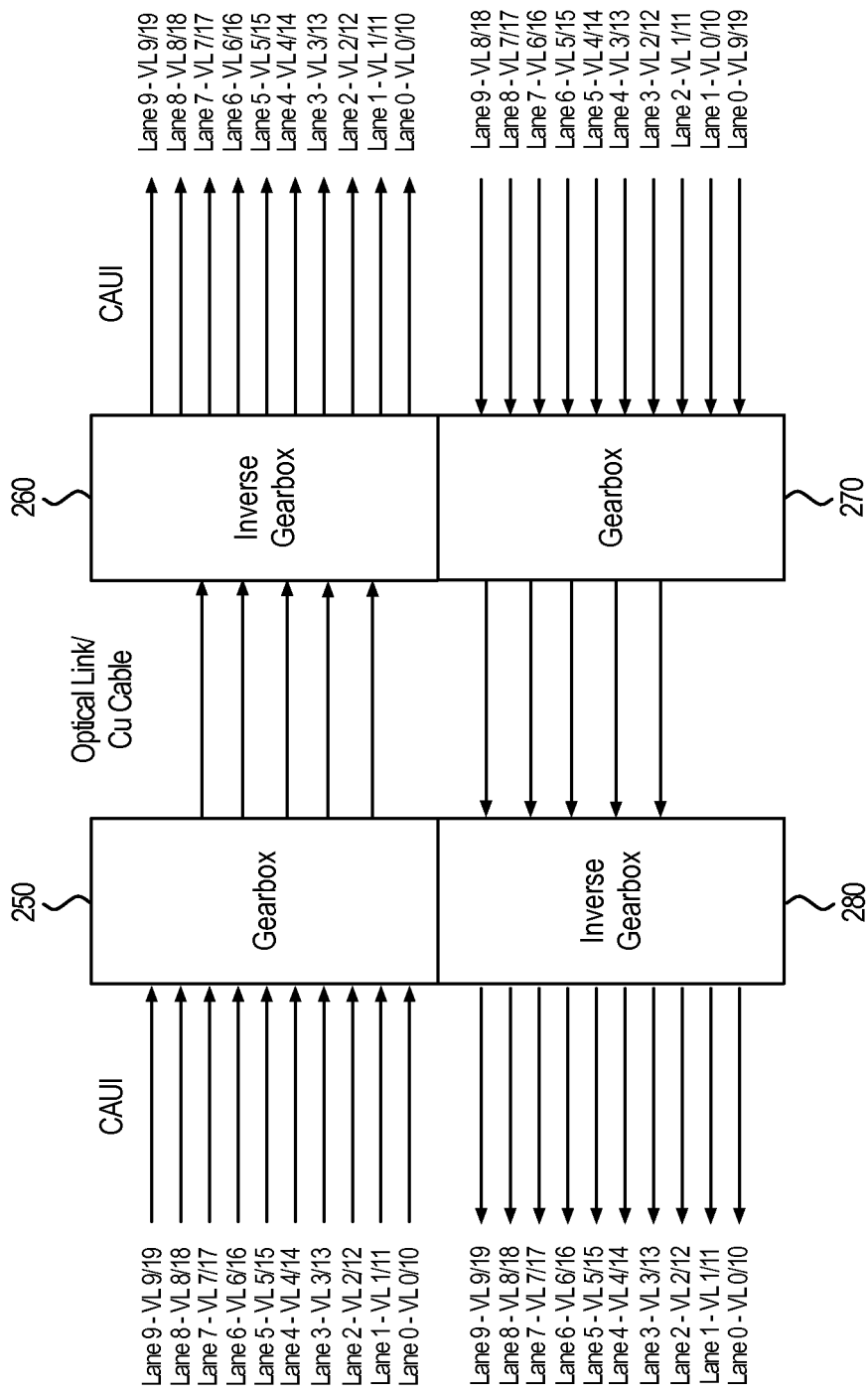

FIG. 2B illustrates the operation of the realignment concept of the present invention using the same virtual lane inputs as FIG. 2A. As illustrated, gearbox 250 is coupled to inverse gearbox 260 via an optical link or copper cable, while gearbox 270 is coupled to inverse gearbox 280 via the optical link or copper cable. In cascaded form, the combination of gearbox 250 and inverse gearbox 260 as well as the combination of gearbox 270 and inverse gearbox 280 serve to facilitate communication of 10 lanes of 10.3125 Gbps traffic as a 100 GbE link. In contrast to FIG. 2A, however, the cascaded gearbox and inverse gearbox of FIG. 2 support VL identification and realignment based on the identified VL identifiers.

As illustrated, the outputs of both inverse gearbox 260 and inverse gearbox 280 are now realigned such that VL 0/10 to 9/19 are traveling on physical lanes 0-9, respectively. This realignment condition is imposed regardless of whether the input virtual lanes are already scrambled or not. More specifically, while gearbox 250 receives VLs 0/10 to 9/19 that are aligned with physical lanes 0-9 and gearbox 270 receives VLs 0/10 to 9/19 that are not aligned with physical lanes 0-9, the outputs of the cascaded inverse gearboxes 260 and 280, respectively, produce VLs 0/10 to 9/19 that are aligned with physical lanes 0-9.

Figure 4:
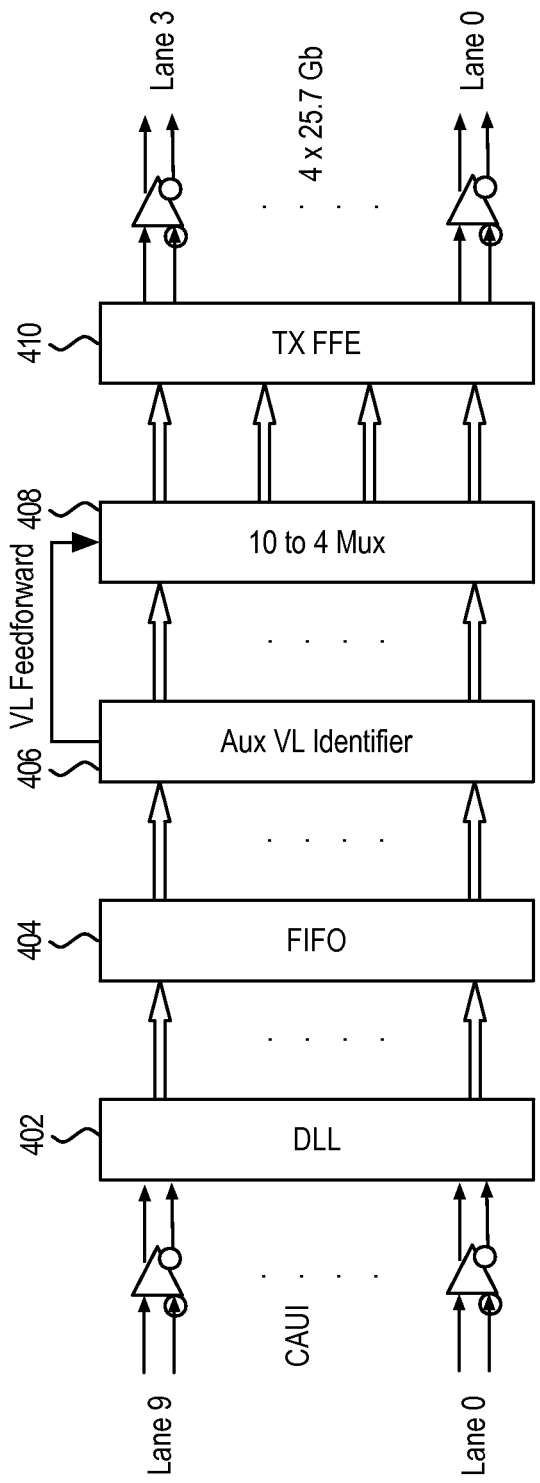
FIG. 4 illustrates an example embodiment of a gearbox according to the present invention.

FIG. 4 illustrates an example embodiment of a gearbox that enables VL identification and realignment based on the VL identification. As illustrated, ten inputs from a CAUI interface are received on physical lanes 0-9 and passed on to delay locked loop (DLL) 402. As demonstrated by the examples of FIG. 2B, the inputs received on physical lanes 0-9 may or may not be scrambled. Thus, in a given installation, any of input physical lanes 0-9 may receive any one of VLs 0/10, 1/11, 2/12, 3/13, etc.

After passing through FIFO 404, the virtual lanes are then passed on to Auxiliary VL Identifier 406. In general, Auxiliary VL Identifier 406 is designed to identify the VL identifiers that are carried within the data flows. Here, it should be noted that Auxiliary VL Identifier 406 can be embodied as a light PCS element such that it does not add significant amounts of delay. The identification of the VL identifiers in the ten data flows enables the gearbox to effectively create a wiring diagram that allows the gearbox to associate the correct data flows to particular physical lanes.

As illustrated, VL-based information is fed forward to 10 to 4 Multiplexer 408 for use in the bit multiplexing process. Here, it should be noted that the particular form and/or type of information that is fed forward by Auxiliary VL Identifier 406 to 10 to 4 Multiplexer 408 would be implementation dependent. In general, any information can be forwarded by Auxiliary VL Identifier 406 to 10 to 4 Multiplexer 408, such that the forwarded information serves to control the function of 10 to 4 Multiplexer 408 in selectively multiplexing bits from the various input data flows to output data flows that are eventually routed to output physical channels. In one example, the forwarded information can represent control signals that control the operation of multiplexing elements.

Based on the control information, 10 to 4 Multiplexer 408 produces four higher-rate channels from the ten input physical channels. These four channels are then output by transmitter 410 to produce four 25.7 Gbps outputs for the four physical lanes. Again, by the provision of the VL-based control information by Auxiliary VL Identifier 406 to 10 to 4 Multiplexer 408, the input virtual lanes are forced into alignment with the output physical lanes.

Figure 5:
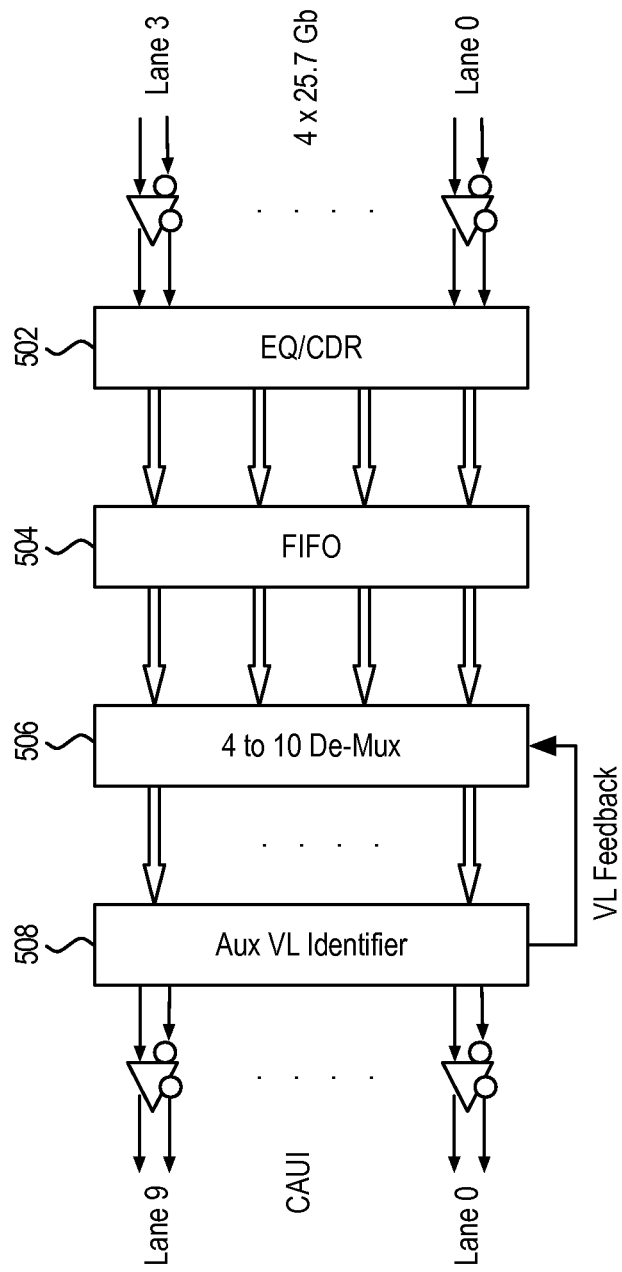
FIG. 5 illustrates an example embodiment of an inverse gearbox according to the present invention.

FIG. 5 illustrates an embodiment of an inverse gearbox that enables VL identification and realignment based on the VL identification. As illustrated, inputs from four 25.7 Gbps lanes are received on physical lanes 0-3 and passed on to Equalization (EQ)/Clock and Data Recovery (CDR) module 502. The four 25.7 Gbps lanes pass through FIFO 504 and on to 4 to 10 De-Multiplexer 506, which generates ten 10.3125 Gbps data flows. These 10 10.3125 Gbps data flows are passed onto Auxiliary VL Identifier 508 for transmission as part of a CAUI interface.

As in the gearbox embodiment of FIG. 4, Auxiliary VL Identifier 508 can be embodied as a light PCS element that does not add significant amounts of delay. In general, Auxiliary VL Identifier 508 can be configured to identify the VL identifiers that are carried within the data flows. Control information based on the identification of the VL identifiers can then be fed back by Auxiliary VL Identifier 508 to 4 to 10 De-Multiplexer 506. This control information enables the inverse gearbox to create an effective wiring diagram such that the correct data flows are output on particular physical lanes of the CAUI interface.

As illustrated, the VL-based information is fed back by Auxiliary VL Identifier 508 to 4 to 10 De-Multiplexer 506 for use in the bit de-multiplexing process. Again, it should be noted that the particular form and/or type of information that is fed back by Auxiliary VL Identifier 508 to 4 to 10 De-Multiplexer 506 would be implementation dependent. In general, any information can be fed back by Auxiliary VL Identifier 508 to 4 to 10 De-Multiplexer 506, such that the fed back information serves to control the function of 4 to 10 De-Multiplexer 506 in selectively de-multiplexing bits from the various input data flows to output data flows that are eventually routed to output physical channels. In one example, the forwarded information can represent control signals that control the operation of de-multiplexing elements.

In an alternative embodiment, the VL identification can occur prior to 4 to 10 De-Multiplexer 506. In such an embodiment, the VL identification would be operative on the 25.7 Gbps data flows instead of the 10.3125 Gbps data flows. Such an embodiment would produce control information that can then be fed forward to 4 to 10 De-Multiplexer 506. As this alternative embodiment illustrates, the particular mechanism by which the VL identifiers are identified within individual data flows can be implementation dependent. What is significant is that the identification of the VL identifiers can be used to control the association of virtual lanes to physical lanes.

Again, it should be recognized that the particular location of the VL identification relative to the multiplexing or de-multiplexing elements would be implementation dependent. Such implementation dependent details can allow for further embodiments where the VL identification component is at least partially integrated with the multiplexing or de-multiplexing elements.

The embodiments described with reference to FIGS. 4 and 5 illustrate example hardware implementations of a gearbox and inverse gearbox, respectively, that incorporate features of the present invention. Such example hardware embodiments are not intended to be limiting.

Figure 6:
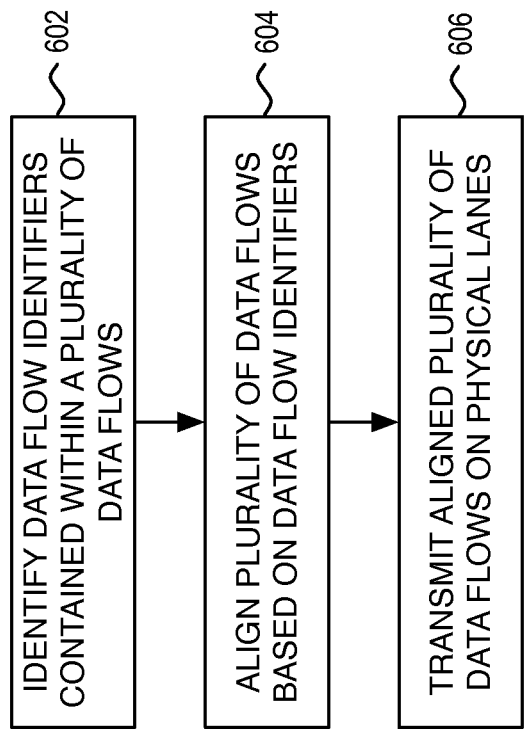
FIG. 6 illustrates an example flowchart of a process of the present invention.

FIG. 6 illustrates a flowchart of an example process of the present invention. As illustrated, the process begins at step 602 where data flow identifiers are identified within a plurality of data flows. In one example, the data flow identifiers are MLD PCS lane identifiers. As would be appreciated, the particular type of data flow identifiers used would be implementation dependent.

Moreover, the particular form of the plurality of data flows can vary. For example, the plurality of data flows may be separate individual data flows (e.g., 10 G channels in a CAUI or XLAUI interface), or a data flows that individually represent a group of data flows that have been combined into a higher-rate data flow (e.g., 25.7 G channel). Regardless of the form in which the plurality of data flows are examined, the process of step 602 can be designed to identify the data flow identifiers contained within the plurality of data flows.

After the data flow identifiers are identified, the process then continues to step 604 where the plurality of data flows are aligned based on the data flow identifiers. As would be appreciated, the particular process of alignment can vary and can be dependent on the particular mechanism of the data flow identification and the location of the data flow identification in the data flow gearbox or inverse gearbox process. In general, any process that uses an identification of the data flow identifiers to correlate an individual data flow with an output associated with a selected physical lane can be used. In a simple example, the alignment process can rely on a selective routing process that figuratively implements a wiring diagram that connects a set of inputs data flows to a set of output data flows.

The alignment of a plurality of data flows provides a basis for a transmission of the plurality of data flows on directed physical lanes at step 606. As noted above, the input data flows can already be scrambled relative to a physical lane. The process culminating at step 606 ensures that output data flows are forced into assigned physical lanes. This alignment enables more efficient de-bugging and testing of the system.

It should be noted that the description above has focused primarily on a gearbox and inverse gearbox that are applied to a CAUI interface. Such a description is not intended to be limiting. The features of the present invention can be applied to an XLAUI interface, to any higher-rate interface that includes identified sub-rate channels, to channels within non-Ethernet system, etc.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A device, comprising:
   a plurality of inputs for receiving a corresponding first plurality of channels carrying a plurality of data flows, each of the first plurality of channels carried on a physical lane of a first set of physical lanes;
   a data flow identifier module configured to identify data flow identifiers contained within the plurality of data flows; and
   a bit de-multiplexer configured to de-multiplex bits from the first plurality of channels into a second plurality of channels that have a lower bit rate as compared to the first plurality of channels, wherein an ordering of bits that are de-multiplexed into the second plurality of channels is based on an identity of the data flow identifiers identified by the data flow identifier module, the bit de-multiplexer also configured to output each of the second plurality of channels onto an assigned physical lane of a second set of physical lanes corresponding to a physical lane of a set of input physical lanes of a multiplexer in accordance with a stored channel assignment definition that maps data flow identifiers to physical lanes, the stored channel assignment definition ensuring that a channel having a particular data flow identifier is always output on the same physical lane that is pre-assigned to the particular data flow identifier based on the input physical lanes of the multiplexers;
   wherein the data flow identifier information is fed back from the data flow identifier module to the bit de-multiplexer.

2. The device of claim 1, wherein the second plurality of channels are 10 Gbit/s channels.

3. The device of claim 2, wherein the first plurality of channels are 25 Gbit/s channels.

4. The device of claim 1, wherein the bit de-multiplexer receives data flow identifier information from the virtual lane identifier module.

5. The device of claim 4, wherein the data flow identifier information is fed forward from the data flow identifier module to the bit de-multiplexer.

6. The device of claim 1, wherein the data flow identifiers are defined by IEEE 802.3ba.

7. A method, comprising:
   receiving, at a plurality of inputs in a device, a first channel and a second channel of a plurality of channels carrying a plurality of data flows;
   identifying, by a data flow identifier module in the device, data flow identifiers contained within the plurality of data flows;
   feeding back data flow identifier information from the data flow identifier module to a bit de-multiplexer of the device;
   generating, by the bit de-multiplexer, a first channel and a second channel of a second plurality of channels from the first plurality of channels, wherein an ordering of bits that are de-multiplexed into the second plurality of channels is based on the data flow identifier information fed back by the data flow identifier module, and
   outputting the first channel of the second plurality of channels onto an assigned first physical lane and the second channel of the second plurality of channels onto an assigned second physical lane, in accordance with a stored channel assignment definition that maps data flow identifiers to physical lanes, the stored channel assignment definition ensuring that a channel having a particular data flow identifier is always output on the same physical lane that is pre-assigned to the particular data flow identifier based on input physical lanes of a multiplexer.

8. The method of claim 7, wherein the second plurality of channels are 10 Gbit/s channels.

9. The method of claim 7, wherein the second plurality of channels are 25 Gbit/s channels.

10. The method of claim 7, further comprising feeding forward data flow identifier information from the data flow identifier module to the bit de-multiplexer.

11. The method of claim 7, wherein the data flow identifiers are defined by IEEE 802.3ba.

12. A method, comprising:
    receiving, at a plurality of inputs in a device, a plurality of 25 Gbit/s channels carrying a plurality of data flows;
    identifying, by a data flow identifier module in the device, data flow identifiers contained within the plurality of data flows;
    feeding back data flow identifier information from the data flow identifier module to a bit de-multiplexer;
    generating, by the bit de-multiplexer having a 2:5 ratio in the device, a plurality of 10 Gbit/s channels from the plurality of 25 Gbit/s channels, wherein an ordering of bits that are de-multiplexed into the plurality of 10 Gbit/s channels is based on the data flow identifier information fed back by the data flow identifier module;
    aligning each of the plurality of 10 Gbit/s channels onto an assigned physical lane in accordance with a stored channel assignment definition that maps data flow identifiers to physical lanes, the stored channel assignment definition ensuring that a channel having a particular data flow identifier is always output on the same physical lane that is pre-assigned to the particular data flow identifier based on a corresponding input physical lane at a bit multiplexer outputting the plurality of 25 Gbit/s channels; and
    outputting each of the plurality of 10 Gbit/s channels onto the assigned physical lane.

13. The method of claim 12, further comprising feeding forward data flow identifier information from the data flow identifier module to the bit de-multiplexer.

14. The method of claim 12, wherein the data flow identifiers are defined by IEEE 802.3ba.

* * * * *